United States Patent
Lee et al.

(10) Patent No.: US 11,751,017 B2
(45) Date of Patent: Sep. 5, 2023

(54) METHOD AND APPARATUS FOR SUPPORTING COMMUNICATION OF USER EQUIPMENT BY USING UNMANNED AERIAL VEHICLE IN MOBILE COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Seunghyun Lee, Gyeonggi-do (KR); Hyungje Lee, Seoul (KR); Hyojin Lee, Gyeonggi-do (KR); Chahyeon Eom, Seoul (KR); Chungyong Lee, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 73 days.

(21) Appl. No.: 17/374,530

(22) Filed: Jul. 13, 2021

(65) Prior Publication Data
US 2022/0014880 A1    Jan. 13, 2022

(30) Foreign Application Priority Data
Jul. 13, 2020    (KR) .......................... 10-2020-0086440

(51) Int. Cl.
*H04W 4/029* (2018.01)
*H04B 17/318* (2015.01)
(Continued)

(52) U.S. Cl.
CPC .......... *H04W 4/029* (2018.02); *H04B 17/318* (2015.01); *H04W 64/006* (2013.01); *H04W 84/06* (2013.01)

(58) Field of Classification Search
None
See application file for complete search history.

(56) References Cited

U.S. PATENT DOCUMENTS

| 9,954,597 B2 | 4/2018 | Boss et al. |
| 2017/0142595 A1* | 5/2017 | Ljung ................ H04B 7/18504 |

(Continued)

FOREIGN PATENT DOCUMENTS

| CN | 106576383 | 7/2017 |
| WO | WO-2017096545 A1 * | 6/2017 |

OTHER PUBLICATIONS

Yin et al ; Intelligent Trajectory Design in UAV-Aided Communications With Reinforcement Learning; IEEE Transactions on Vehicular Technology, vol. 68, No. 8, Aug. 2019 (Year: 2019).*

(Continued)

*Primary Examiner* — German Viana Di Prisco
(74) *Attorney, Agent, or Firm* — The Farrell Law Firm, P.C.

(57) ABSTRACT

A method of a base station in a mobile communication system is provided, which includes receiving position information of at least one UE; determining an initial position of a UAV based on the position information; transmitting, to the UAV, control information related to the initial position and association information between the at least one UE and the UAV; receiving, from the UAV, first feature information related to a communication state between the at least one UE and the UAV; and transmitting control information related to a movement position of the UAV based on an output of a reinforced learning network to which the first feature information is input.

20 Claims, 16 Drawing Sheets

(51) Int. Cl.
*H04W 64/00* (2009.01)
*H04W 84/06* (2009.01)

(56) References Cited

U.S. PATENT DOCUMENTS

2020/0229206 A1* 7/2020 Badic .................... H04W 40/22
2021/0110136 A1* 4/2021 Ganti .................... G06K 9/629
2021/0287556 A1* 9/2021 Hong .................... B64C 39/024

OTHER PUBLICATIONS

Bayerlein et al; Trajectory Optimization for Autonomous Flying Base Station via Reinforcement Learning; 2018 IEEE 19th International Workshop on Signal Processing Advances in Wireless Communications (SPAWC) (Year: 2018).*

T.M. Nguyen, W. Ajib and C. Assi, "A Novel Cooperative NOMA for Designing UAV-Assisted Wireless Backhaul Networks", 10 pages.

M. Mozaffari, W. Saad, M. Bennis and M. Debbah, "Mobile Unmanned Aerial Vehicles (UAVs) for Energy-Efficient Internet of Things Communications", Sep. 12, 2017, 33 pages.

Y. Zeng, R. Zhang and T. J. Lim, "Throughput Maximization for UAV-Enabled Mobile Relaying Systems", Apr. 9, 2016, 14 pages.

Han A. L. Swindlehurst and K. J. R. Liu, "Optimization of MANET connectivity in smart deployment/movement of unmanned air vehicles", Sep. 7, 2009, 14 pages.

S. Jeong, O. Simeone and J. Kang, "Mobile Edge Computing via a UAV-Mounted Cloudlet: Optimization of Bit Allocation and Path Planning", May 18, 2017, 14 pages.

A. Al-Hourani, S. Kandeepan and S. Lardner, "Optimal LAP Altitude for Maximum Coverage", Apr. 28, 2014, 5 pages.

M. Alzenad, A. El-Keyi, F. Lagum and H. Yanikomeroglu, "3-D Placement of an Unmanned Aerial Vehicle Base Station (UAV-BS) for Energy-Efficient Maximal Coverage", May 9, 2017, 4 pages.

X. Liu, Y. Liu, and Y. Chen, "Reinforcement Learning in Multiple-UAV Networks: Deployment and Movement Design", Jun. 11, 2019, 13 pages.

C. H. Liu, Z. Chen, J. Tang, J. Xu and C. Piao, "Energy-Efficient UAV Control for Effective and Fair Communication Coverage: A Deep Reinforcement Learning Approach", Apr. 24, 2018, 11 pages.

* cited by examiner

FIG. 1
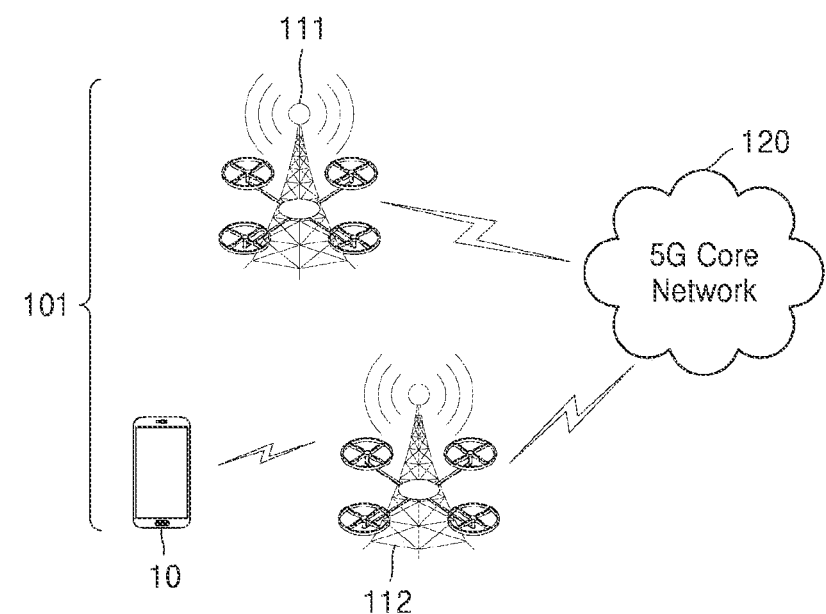
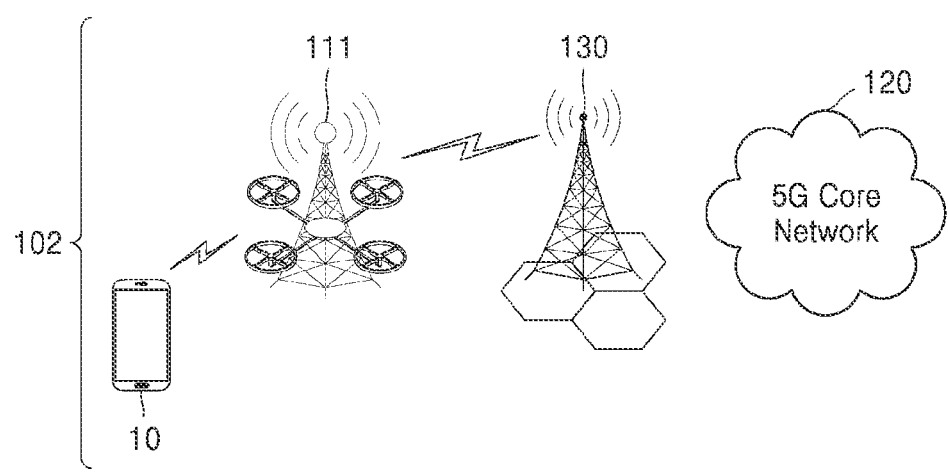

METHOD AND APPARATUS FOR SUPPORTING COMMUNICATION OF USER EQUIPMENT BY USING UNMANNED AERIAL VEHICLE IN MOBILE COMMUNICATION SYSTEM

CROSS-REFERENCE TO RELATED APPLICATION

This application is based on and claims priority under 35 U.S.C. § 119 to Korean Patent Application No. 10-2020-0086440, which was filed in the Korean Intellectual Property Office on Jul. 13, 2020, the entire disclosure of which is incorporated herein by reference.

BACKGROUND

1. Field

The disclosure relates generally to a method and apparatus for supporting communication of a user equipment (UE) by using an unmanned aerial vehicle (UAV) in a mobile communication system.

2. Description of the Related Art

To meet increasing demand for wireless data traffic since the commercialization of 4th generation (4G) communication systems, considerable efforts have been made to develop improved 5th generation (5G) communication systems or pre-5G communication systems. 5G communication systems or pre-5G communication systems may also be referred to as beyond 4G network communication systems or post long term evolution (LTE) systems.

To achieve a high data rate, implementation of 5G communication systems in an ultra-high frequency band (millimeter wave (mmWave)) (e.g., a 60 GHz band) is under consideration.

To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antennas, analog beamforming, and large-scale antenna systems have been discussed.

To improve a system network for 5G communication, technologies, such as evolved small cell, advanced small cell, cloud radio access network (RAN), ultra-dense network, device-to-device (D2D) communication, wireless backhaul, moving network, cooperative communication, coordinated multi-points (CoMP), and reception interference cancellation, are being developed.

For use in a 5G system, advanced coding modulation (ACM) techniques are being developed, such as hybrid frequency shift keying (FSK) and quadrature amplitude modulation (QAM) (FOAM), and sliding window superposition coding (SWSC), and advanced access technologies are being developed, such as filter bank multi carrier (FBMC), non-orthogonal multiple access (NOMA), and sparse code multiple access (SCMA).

Currently, the development of technologies using a UAV in a communication system is in progress. For example for disaster monitoring, border surveillance, emergency support, etc., the ease of deployment, low maintenance cost, and high maneuverability make UAVs a suitable choice for commercial applications.

In particular, to improve the coverage of a next generation node B (gNB), a technique of using a UAV as a gNB or a relay node has been proposed.

Accordingly, a need exists for a method that is capable of promptly supporting communication of a UE by adaptively deploying a UAV according to a situation of the UE, when a mobile communication system uses the UAV.

SUMMARY

The disclosure is provided to address at least the problems and/or disadvantages described above and to provide at least the advantages described below.

In accordance with an aspect of the disclosure, a method is provided for a base station in a mobile communication system. The method includes receiving position information of at least one UE, determining an initial position of a UAV based on the position information, transmitting, to the UAV, control information related to the initial position and association information between the at least one UE and the UAV, receiving, from the UAV, first feature information related to a communication state between the at least one UE and the UAV, and transmitting control information related to a movement position of the UAV based on an output of a reinforced learning network to which the first feature information is input.

In accordance with another aspect of the disclosure, a method is provided for a UAV in a mobile communication system. The method includes receiving, from a base station, control information related to an initial position and association information between at least one UE and the UAV, supporting communication of the at least one UE by moving based on the control information related to the initial position, transmitting, to the base station, first feature information related to a communication state between the at least one UE and the UAV, and receiving control information related to a movement position of the UAV in response to the first feature information.

In accordance with another aspect of the disclosure, a base station is provided to support communication of a UE by using a UAV in a mobile communication system. The base station includes a communicator configured to transmit and receive signals to and from the at least one UE and the UAV, a memory configured to store a program and data for operations of the base station, and at least one processor configured to execute the program stored in the memory to determine an initial position of the UAV based on position information of the at least one UE, to transmit, to the UAV, control information related to the initial position and association information between the at least one UE and the UAV, to receive, from the UAV, first feature information related to a communication state between the at least one UE and the UAV, and to transmit control information related to a movement position of the UAV according to an output of a reinforced learning network to which the first feature information is input.

In accordance with another aspect of the disclosure, a UAV is provided to support communication between a base station and at least one UE in a mobile communication system. The UAV includes a communicator configured to transmit and receive to and from the at least one UE and the base station, a memory configured to store a program and data for operations of the UAV, and at least one processor configured to execute the program stored in the memory to receive, from the base station, control information related to an initial position of the UAV and association information between the at least one UE and the UAV, to support communication of the at least one UE by moving based on the control information related to the initial position, to transmit, to the base station, first feature information related to a communication state between the at least one UE and the UAV, and to receive control information related to a movement position of the UAV in response to the first feature information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates a mobile communication system in which a UAV is used, according to an embodiment;

DETAILED DESCRIPTION

Figure 2:
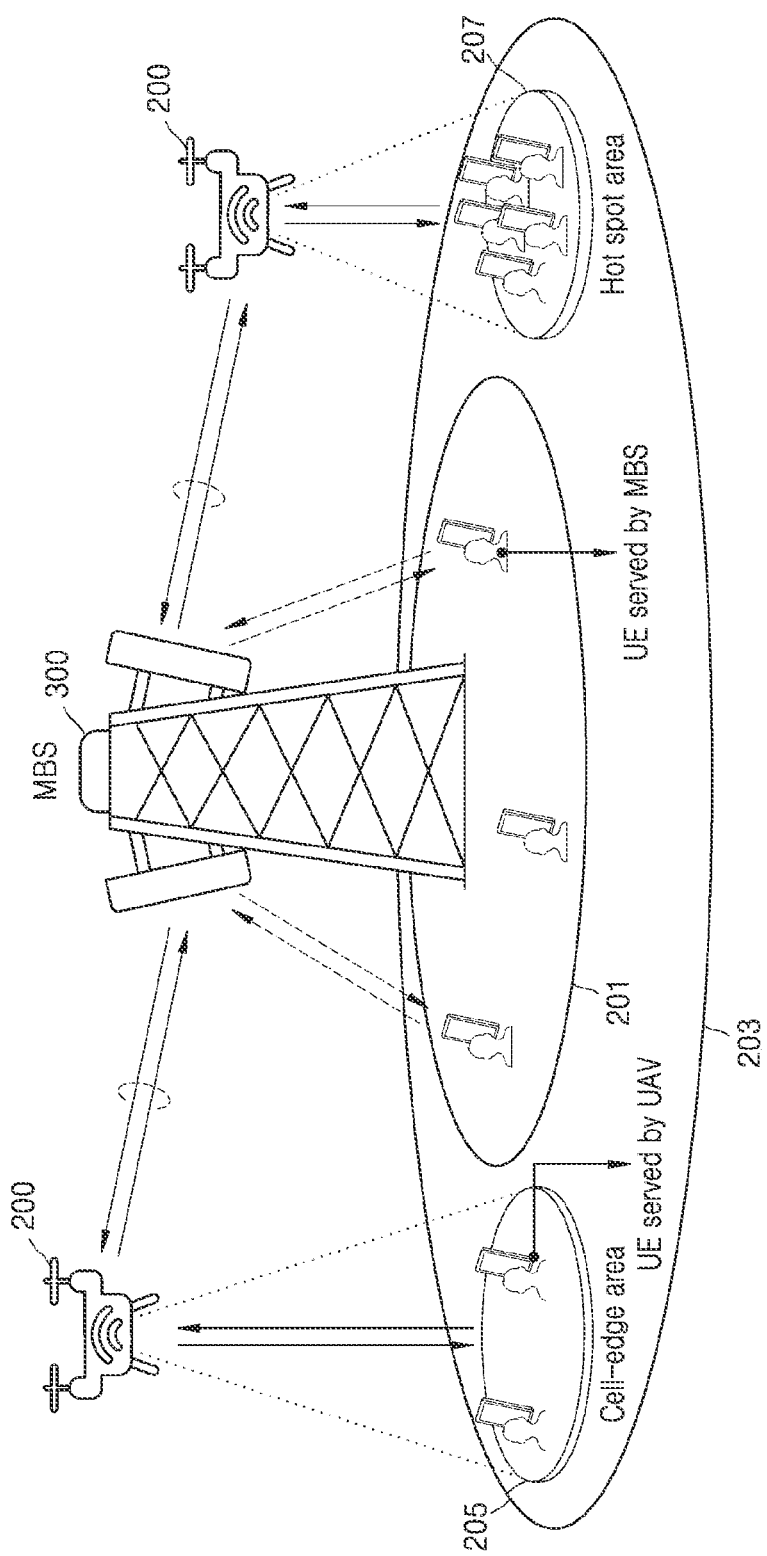
FIG. 2 illustrates a mobile communication system that supports communication of a UE by using a UAV, according to an embodiment.

Various embodiments of the disclosure will now be described in detail with reference to the accompanying drawings. In the following description, specific details such as detailed configuration and components are provided merely to assist the overall understanding of these embodiments. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Throughout the disclosure, the expression "at least one of a, b or c" may indicate only a, only b, only c, both a and b, both a and c, both b and c, all of a, b, and c, or variations thereof.

Examples of a terminal may include a UE, a mobile station (MS), a cellular phone, a smartphone, a computer, a multimedia system capable of performing a communication function, etc.

In the disclosure, a controller may be referred to as a processor, and a layer (or a layer apparatus) may also be referred to as an entity.

The terms used to describe the disclosure below may be defined by considering functions in the disclosure and may vary according to user or operator intentions or practices. Thus, the terms should be defined based on the description throughout the disclosure.

Some components are exaggerated, omitted, or schematically illustrated in the accompanying drawings. As such, the size of each component does not fully reflect the actual size.

In each figure, the same or corresponding elements may be assigned the same reference numerals.

The respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s).

Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s).

Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Additionally, each block in the flowcharts may represent part of a module, segment, or code that includes one or more executable instructions for executing a specified logical function(s).

In some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein may refer to a software element or a hardware element, such as field programmable gate array (FPGA) or application specific integrated circuit (ASIC), and the "module" or "-er/or" performs certain functions.

However, the term "module" or "-er/or" is not limited to software or hardware.

The term "module" or "-er/or" may be configured in an addressable storage medium or may be configured to reproduce one or more processors.

Therefore, for example, the term "module" or "-er/or" may include elements, such as software elements, object-oriented software elements, class elements, and task elements, processes, functions, attributes, procedures, subroutines, segments of program code, drivers, firmware, microcodes, circuits, data, databases, data structures, tables, arrays, and variables.

Functions provided in the elements and the "modules" or "-ers/ors" may be combined with fewer elements and "modules" or "-ers/ors", or may be separated from additional elements and "modules" or "-ers/ors."

Further, the elements and the "modules" or "-ers/ors" may be implemented to reproduce one or more central processing units (CPUs) in the device or secure multimedia card.

Also, a "module" or "-er/or" may include one or more processors.

The term for identifying an access node, the term referring to network entities, the term referring to messages, the term referring to an interface between network entities, the terms referring to a variety of identification information, etc., are exemplified for convenience of description.

Therefore, the disclosure is not limited to the terms to be described later, and other terms referring to entities having an equivalent technical meaning may be used.

For convenience of description, the disclosure may use terms and names defined in LTE and new radio (NR) standards defined by the 3rd Generation Partnership Project (3GPP) group. However, the disclosure is not limited by the terms and names and may be equally applied to other systems conforming to other standards.

In particular, the disclosure may be applied to 3GPP NR (5G mobile communication standard).

In addition, embodiments of the disclosure may be applied to other communication systems having a similar technical background or channel type.

Also, the disclosure may be applicable to other communication systems through some modifications without departing from the scope of the disclosure.

According to an embodiment, a method and apparatus are provided for adaptively deploying a UAV according to a situation of a UE, by using an RL network, when the UAV is used as a base station or a relay node.

A UAV may be deployed in an optimal position, and thus, quality of service (QoS) of a plurality of users may be maximized.

In various situations, such as disaster monitoring, border surveillance, emergency support, etc., a UAV may be used due to the ease of deployment, low maintenance cost, and high maneuverability thereof.

In terms of mobile communication, there is growing interest in using a mobile access node (e.g., UAV eNB/gNB/ng-eNB, UxNB, etc.) mounted on the UAV, referred to herein as a UxNB, to improve coverage.

The Institute of Electrical and Electronics Engineers (IEEE) standard specification TR 38.811 describes unmanned aircraft systems (UAS) including high altitude pseudo satellites (HAPS) being used as a base station.

An altitude of the UAS may be between about 8 km and about 50 km.

UxNBs flying at a low altitude, e.g., about 100 m, have the advantage of being more flexible in terms of coverage and faster deployment than UASs located at relatively high altitudes.

FIG. 1 illustrates a mobile communication system using a UAV according to an embodiment.

Referring to FIG. 1, in a mobile communication system 101, UxNBs 111 and 112 may operate as base stations between a UE 10 and a core network 120.

Alternatively, in a mobile communication system 102, a UxNB 111 may operate as a relay node of a base station 130 between the UE 10 and the core network 120.

FIG. 2 illustrates a mobile communication system that supports communication of a UE with a UAV according to an embodiment.

Referring to FIG. 2, a cell 203 receives a service from the base station 300. For example, the base station 300 includes a macrocell base station (MBS) that provides a radio signal coverage within a macrocell.

In the cell 203, a plurality of UEs within a coverage 201 of the base station 300 may receive services from the base station 300.

However, with respect to UEs within a cell-edge area 205 or a hot spot area 207, in which a large number of users are boated in a narrow space, the UAV 200 may be used as a relay node of the base station.

By using the UAV 200, a coverage of the base station may be improved.

Compared to the UAV 200 providing a service at a fixed position, communication performance may be improved by moving and operating the UAV 200 according to a designed movement trajectory.

Specifically, communication performance may be further improved by deploying a UAV based on an RL network.

New signaling may be required for communication systems using UAVs based on RL networks.

For example, in a link between the UAV 200 and the UE, a reference signal, channel state information (CSI) feedback, downlink/uplink data, user features, etc., may be exchanged.

In a link between the base station 300 and the UAV 200, RL data, association information between the base station 300 and the UAV 200, and deployment and movement information of the UAV 200 may be exchanged.

In a learning step, the base station 300 may collect learning data for deploying a UAV, and then train an RL network based on the collected learning data.

In a serving step, the base station 300 may determine an optimal position of the UAV 200 based on current situation data by using the trained RL network. The base station 300 may control the UAV 200 to move to the determined position.

Figure 3:
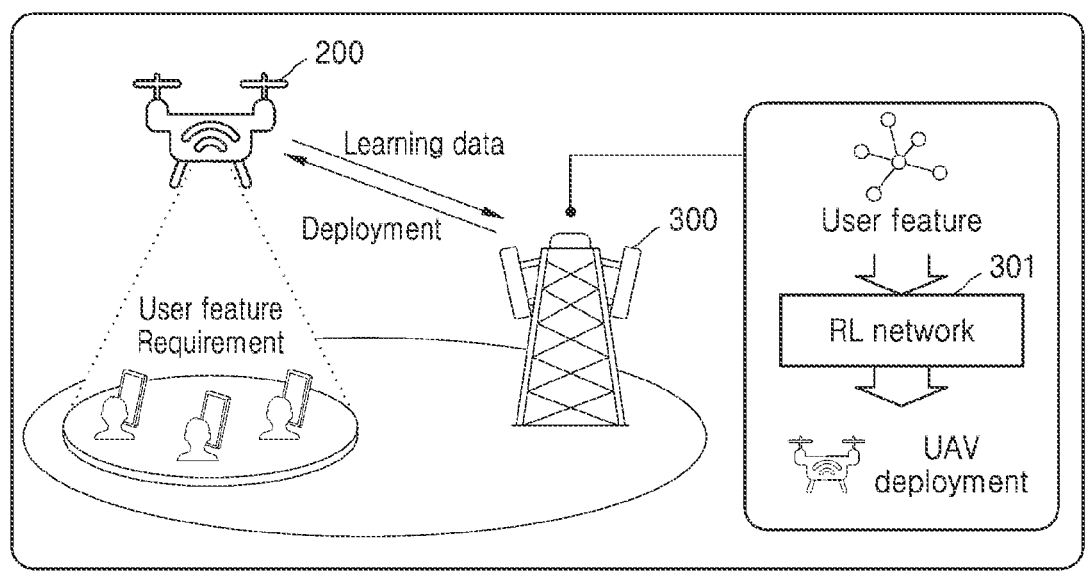
FIG. 3 illustrates a learning process for deploying a UAV in a mobile communication system, according to an embodiment.

FIG. 3 illustrates a learning process for deploying a UAV in a mobile communication system according to an embodiment.

Referring to FIG. 3, when the UAV 200 is first deployed, the base station 300 may receive, through the UAV 200, learning data reflecting a current situation of UEs.

The base station 300 may receive, from the UAV 200, learning data including user features, user requests, or communication environment information.

For example, the learning data may include position information of the UAV 200, a RSS of a UE according to a position of the UAV 200, CSI, QoS, UE request information regarding latency and data rate, and/or a user class.

An RL network 301 may learn learning data received from the UAV 200 so that the base station 300 may move and deploy the UAV 200 at an optimal position in a current situation.

The base station 300 may learn the learning data in a reinforced manner, thereby optimizing a weight and/or bias of the RL network 301.

The RL network 301 may be an artificial neural network that is trained to select an optimal action for a certain state.

The base station 300 may input the learning data received from the UAV 200 as a state of the RL network 301, and obtain parameters related to movement of the UAV 200 as an output of the RL network 301.

The RL network 301 may include various artificial neural networks, such as a deep neural network (DNN), a convolution neural network (CNN), and a recurrent neural network (RNN).

For example, the RL network 301 may include a DQN based on the DNN.

The DQN may be a network for configuring a Q function that outputs, in the DNN format, an expected value with a current state and actions that may be performed in the current state as an input.

The DQN may be updated to take an action that may obtain the most reward with high accuracy by repeatedly learning a reward for performing a specific action "A" in a specific state "S".

Figure 4:
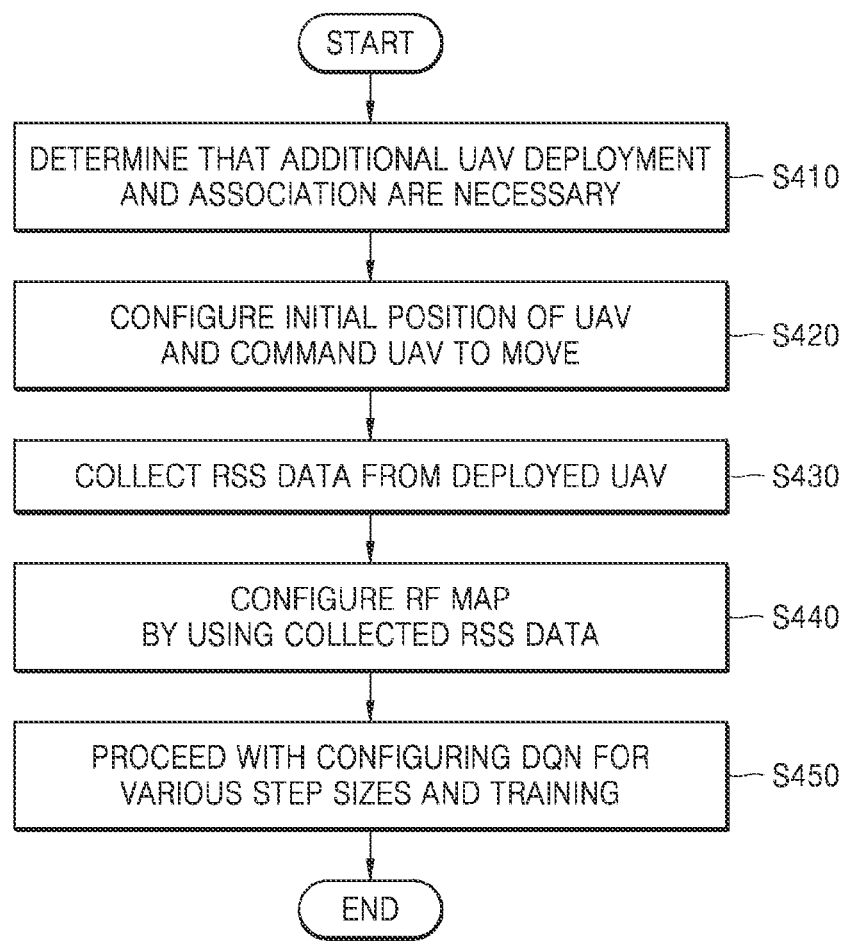
FIG. 4 is a flowchart illustrating a method of a base station for training for deployment of a UAV, according to an embodiment.

FIG. 4 is a flowchart illustrating a method in which a base station performs training for deployment of a UAV, according to an embodiment.

Referring to FIG. 4, in step S410, a base station 300 determines that it is necessary to deploy an additional UAV. For example, the base station 300 may determine that it is necessary to deploy an additional UAV, in response to receiving a request from a plurality of UEs or when the QoS decreases.

In step S420, the base station 300 configures an initial position where the UAV 200 is to be deployed, and transmits a control signal for commanding the UAV 200 to move to the initial position. For example, the base station 300 may determine a centroid of positions of UEs to receive a service from the UAV 200, as the initial position.

In step S430, the base station 300 receives learning data reflecting a current situation of the UEs through the UAV 200 deployed in the initial position. For example, the base station 300 may receive, from the UAV 200, data indicating a strength of a reference signal received by the UE from the UAV 200.

In step S440, the base station 300 configures a radio frequency (RF) map by using the received RSS data. For example, a method in which the base station 300 configures the RF map based on the RSS data will be described in more detail below, with reference to FIG. 5.

In step S450, the base station 300 trains a DQN by using an RF map. For example, the base station 300 may configure DQNs for various preset step sizes and train each of the DQNs.

Figure 5:
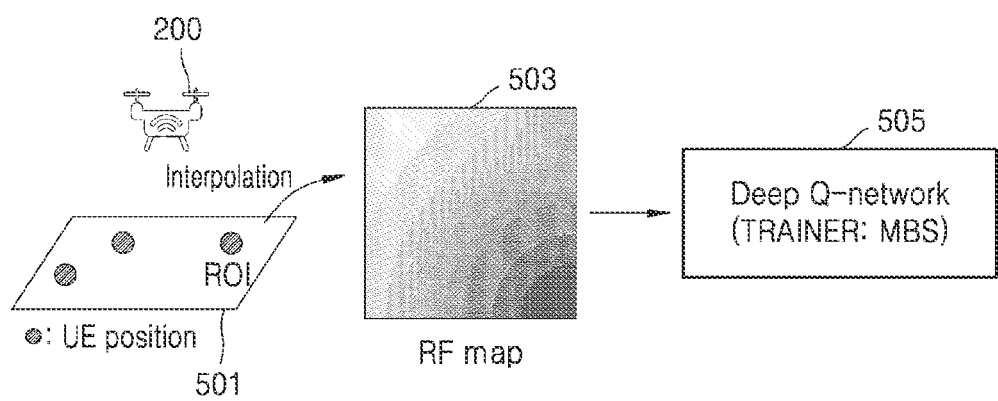
FIG. 5 illustrates a process of performing training on a deep Q-network (DQN) using received signal strength (RSS) data, according to an embodiment.

FIG. 5 illustrates a process of performing training on a DQN by using RSS data, according to an embodiment.

Referring to FIG. 5, a base station 300 may collect strength information of a reference signal received by UEs within a region-of-interest (ROI) 501 through the UAV 200. The strength of the reference signal received by the UEs within the ROI 501 from the UAV 200 may vary according to a position of the UAV 200 and the UEs.

Thus, as illustrated in FIG. 5, the base station 300 performs interpolation of the collected information, thereby obtaining an RF map 503 indicating a RSS that varies according to the position of the UAV and the UE.

The base station 300 may train a DQN 505 by using the RF map 503 as an input in order to optimize a weight and bias of the DQN 505 based on the RF map 503.

Figure 6:
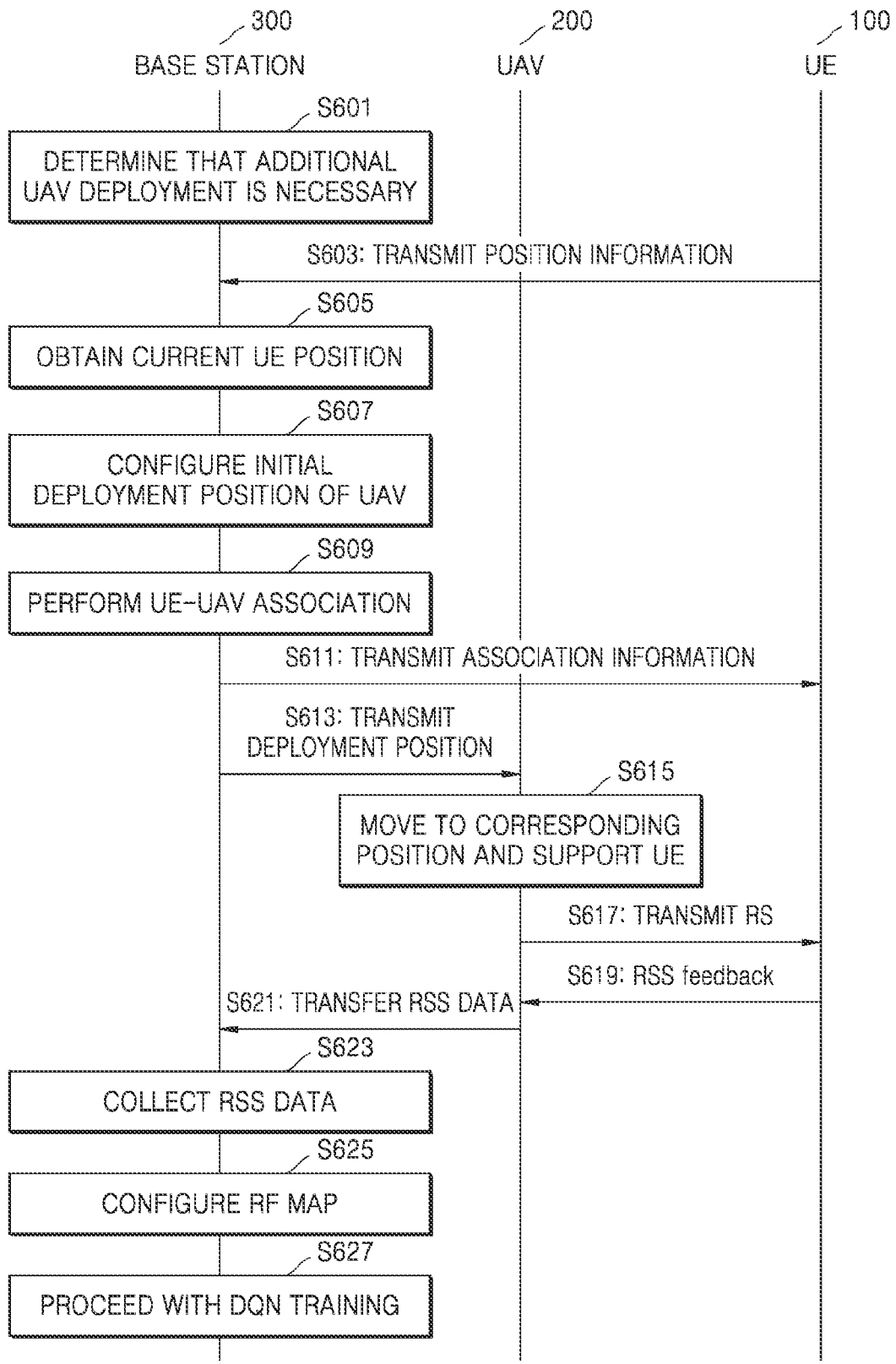
FIG. 6 is a signal flow diagram illustrating a mobile communication system training method for deployment of a UAV, according to an embodiment.

FIG. 6 is a flowchart illustrating a method in which a mobile communication system performs training for deployment of a UAV, according to an embodiment.

Referring to FIG. 6, in step S601, a base station 300 determines that it is necessary to deploy an additional UAV. The base station 300 may determine that it is necessary to deploy a UAV for UEs that are located in a cell-edge area or a hot spot area. For example, similar to step S410 in FIG. 4, when a request is received from a plurality of UEs or when a QoS decreases, the base station 300 may determine that it is necessary to deploy an additional UAV.

In step S603, a UE 100 transmits position information of at least one UE 100 to the base station 300.

In step S605, the base station 300 obtains positions of the UEs 100.

In step S607, the base station 300 determines an initial position where the UAV 200 is to be deployed based on the positions of the UEs 100. For example, the base station 300 may determine a position corresponding to a centroid of the positions of the UEs 100 as the initial position.

Accordingly, when the UEs move, the base station 300 may change the initial position to a centroid of new positions of the UEs.

However, the disclosure is not limited to an example in which a centroid of positions of UEs is determined as an initial position. For example, a position for which a high data rate performance is expected, based on position information of the UEs, may be determined as the initial position.

In step S609, the base station 300 performs association of determining UEs 100 to be served by the UAV 200. The base station 300 may group UEs within the ROI and determine UEs to be served by the UAV 200 among the grouped UEs.

In step S611, the base station 300 transmits association information to the UEs 100 and the UAV 200.

In step S613, the base station 300 transmits an initial position where the UAV 200 is to be deployed.

In step S615, the UAV 200 moves to the initial position in order to support the UE 100. The UAV 200 may move to the initial position and communicate with the UE 100. For example, the UAV 200 may exchange a reference signal with the UE 100.

In step S617, the UAV 200 transmits a reference signal, and in step S619, the UAV 200 receives RSS feedback from the UE 100. That is, the UE 100 measures a reference signal and transfers RSS data to the UAV 200 based on the measured reference signal.

In step S621, the UAV 200 transfers the RSS data to the base station 300.

In step S623, the base station 300 collects RSS data from a plurality of UEs.

In step S625, the base station 300 configures an RF map based on the collected RSS data. For example, as described above with reference to FIG. 5, the base station 300 may apply interpolation to the obtained RSS data and obtain the RF map.

In step S627, the base station 300 trains a DQN based on the RF map.

The base station 300 may configure a plurality of DQNs according to a step size by which the UAV 200 moves, and perform an additional training.

The step size by which the UAV 200 moves may be differently configured according to an area in which UEs supported by the UAV 200 are distributed.

The mobile communication system may control the UAV 200 to move to an optimal position by using an RL network trained based on current situation data.

In this case, a method of operating a UAV by adaptively adjusting a step size may be used for prompt UE support.

Figure 7:
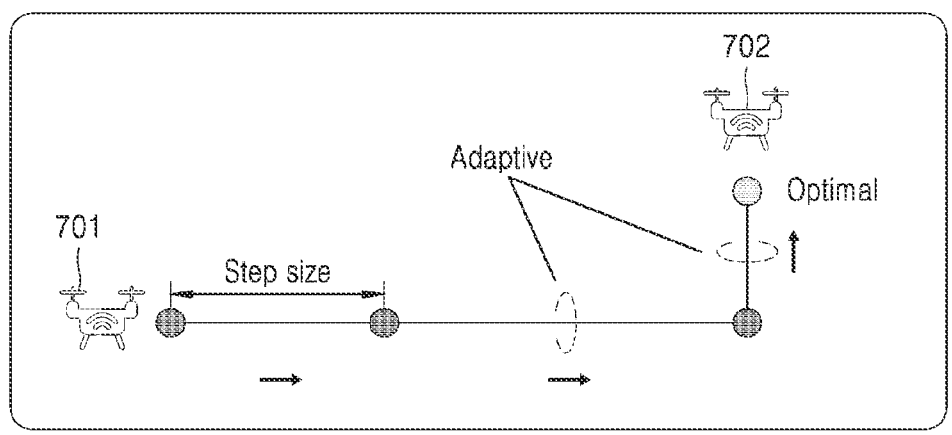
FIG. 7 illustrates a process in which a UAV moves based an adaptive step size, according to an embodiment.

FIG. 7 illustrates a process in which a UAV moves based an adaptive step size, according to an embodiment.

Referring to FIG. 7, when moving from an initial position 701 to an optimal position 702, a UAV may move with an adaptively adjusted step size rather than a fixed step size.

The UAV may be flexibly deployed and thus promptly support a UE by moving by a step size adjusted according to changes in system parameters such as an RSS.

Figure 8:
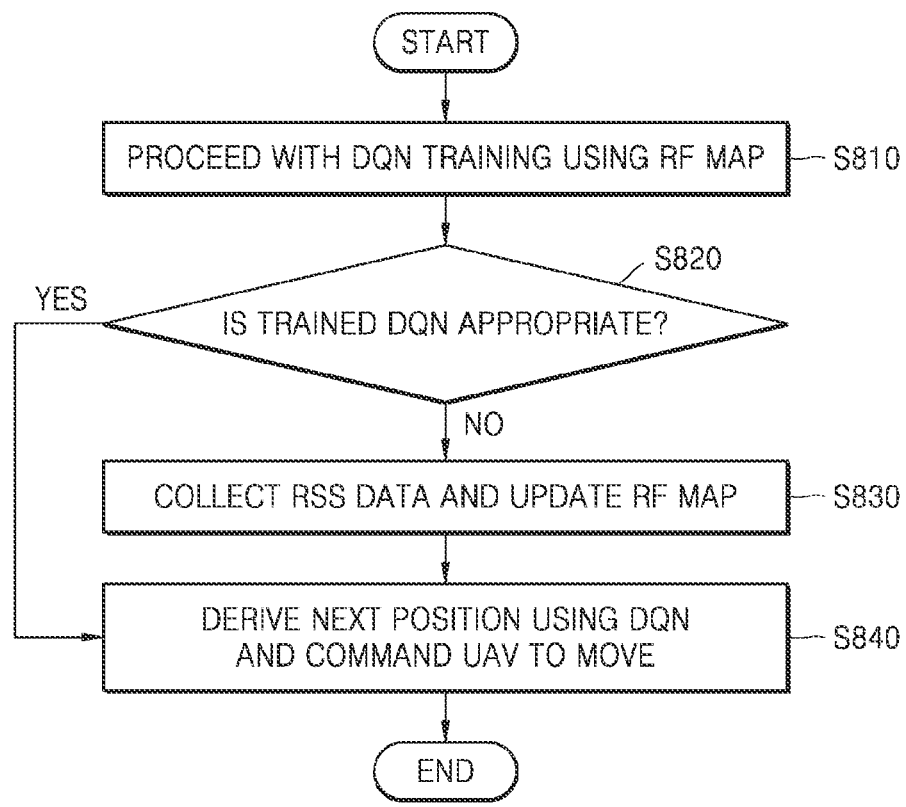
FIG. 8 is a flowchart illustrating a method in which a base station operates a UAV by using a trained DQN, according to an embodiment.

FIG. 8 is a flowchart illustrating a method in which a base station operates a UAV using a trained DQN, according to an embodiment.

Referring to FIG. 8, in step S810, the base station 300 proceeds with a DQN training using an RF map, e.g., as described above with reference to FIGS. 4 to 6.

In step S820, the base station 300 determines whether the trained DQN is appropriate. The base station 300 may determine whether the trained DQN is appropriate based on at least one of a reward applied to the DQN, current RSS data of UEs, or the RF map used for training the DQN, For example, the base station 300 may determine whether the trained DQN is appropriate by comparing the DQN reward to a threshold value. When the DQN reward is greater than or equal to a threshold value, the base station 300 may determine that the trained DQN is appropriate.

The DQN reward may be determined based on a result of comparison between downlink data rates before and after moving of the UAV 200. For example, when the downlink data rate after moving of the UAV 200 is greater than the downlink data rate before moving, it may be determined that the UAV 200 moves in an appropriate manner and a high reward may be applied to the DQN. When a downlink data rate from the UAV 200 to a UE before moving is Rold, and a downlink data rate after moving is Rnew, a reward may be determined as follows:

When Rnew>Rold, the reward may be determined to be 1.

When Rnew=Rold, the reward may be determined to be −0.1, when Rnew<Rod, the reward may be determined to be −1, and when the UAV 200 deviates from the ROI, the reward may be determined to be −10.

In another example, the base station 300 may determine whether the trained DQN is appropriate by comparing the RSS data used for training the DQN with RSS data currently received.

For example, when a difference between the RSS data used for training the DQN and the RSS data currently received is large, the base station may determine that the trained DQN is inappropriate, and may determine to receive training again to reflect a current situation of the UEs.

When it is determined that the trained DQN is appropriate in step S829, the base station 300 derives a next position of the UAV 200 by using the trained DQN and may command the UAV 200 to move in step S840.

However, when it is determined that the trained DQN is inappropriate in step S820, the base station 300 re-collects RSS data and updates the RF map in step S830. The base station 300 may train the DQN again based on the updated RF map. Then, the base station 300 derives a next position of the UAV 200 by using the updated DQN and may command the UAV 200 to move in step S840.

Figure 9:
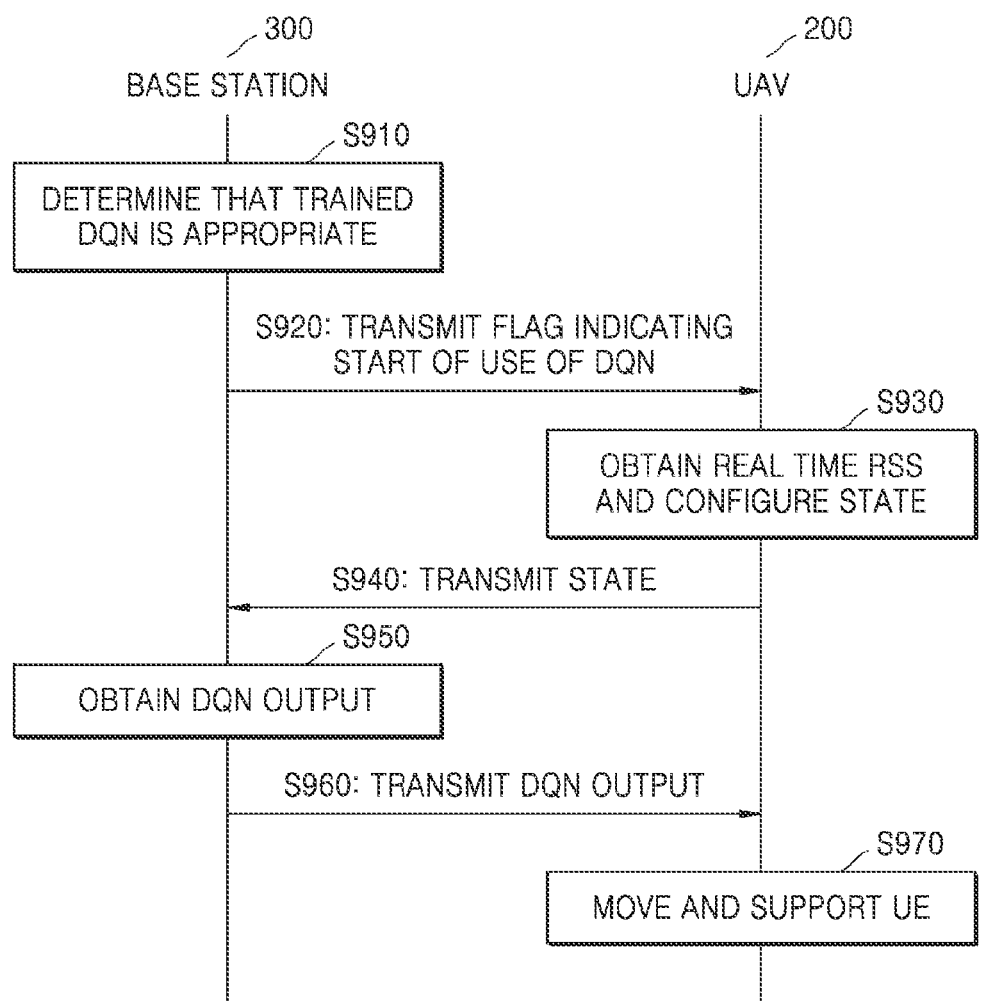
FIG. 9 is a signal flow diagram of a mobile communication system operating a UAV using a trained DQN, according to an embodiment.

FIG. 9 is a flowchart illustrates a method in which a mobile communication system operates a UAV by using a trained DQN, according to an embodiment.

In step S910, a base station 300 determines that the trained DQN is appropriate. For example, when the DQN reward is greater than or equal to a threshold value, the base station 300 may determine that the trained DQN is appropriate.

Alternatively, upon comparison between RSS data used for training the DQN and RSS data currently received, when the difference is less than or equal to a threshold value, the base station 300 may determine that the trained DQN is appropriate.

In step S920, the base station 300 transmits, to the UAV 200, a flag indicating the start of use of the DQN.

In step S930, the UAV 200 obtains real-time RSS data and configures a state to be input to the DQN. For example, the state may be expressed in a matrix including a three-dimensional coordinate value of the UAV 200 and the RSS data. However, the example is not limited thereto, and the state may include parameters indicating a current state of a UE, such as requirements for each UE, CSI, QoS, user class, etc.

In step S940, the UAV 200 transmits the configured state to the base station 300.

In step S950, the base station 300 applies the state received from the UAV 200 to the DQN as an input, thereby obtaining a DQN output. The base station 300 may obtain parameters related to movement of the UAV 200 as the DQN output. For example, the DQN output may include a movement direction of the UAV 200 that includes one of six coordinate axial directions of +x, −x, +y, −y, +h, and −h.

Alternatively, the DQN output may include a three-dimensional coordinate value indicating a next position of the UAV 200.

In step S960, the base station 300 transmits the DQN output to the UAV 200.

In step S970, the UAV 200 moves based on the DQN output received from the base station 300, and supports communication of the UE at the new position.

When movement of the UAV 200 is controlled by using the DQN that has learned a current situation of the UEs, the base station 300 may move the UAV 200 with an adaptively adjusted step size rather than a fixed step size.

Figure 10:
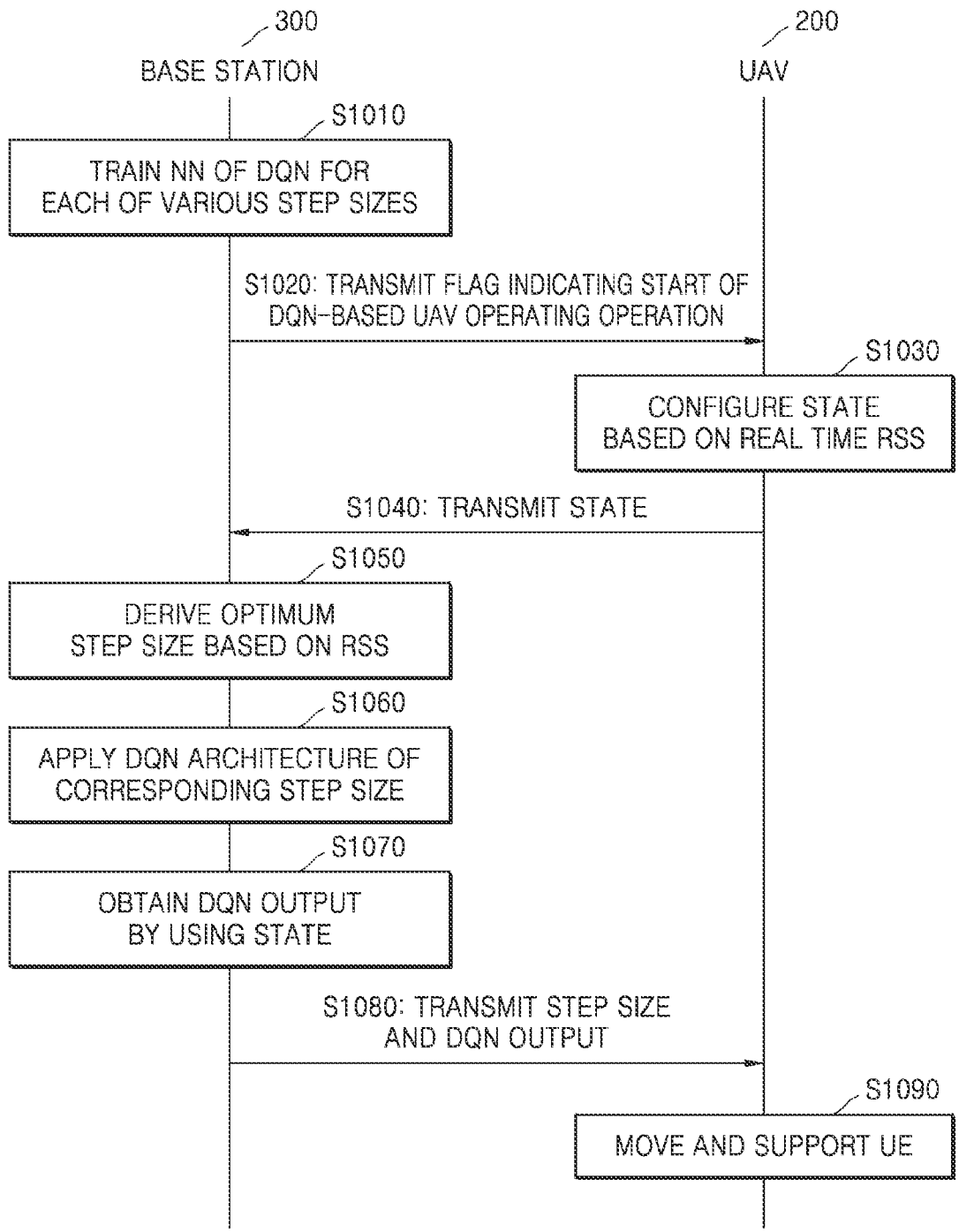
FIG. 10 signal flow diagram of a mobile communication system operating a UAV using a trained DQN, according to an embodiment.

FIG. 10 is a signal flow diagram illustrating a method in which a mobile communication system operates a UAV using a trained DQN, according to an embodiment.

Referring to FIG. 10, in step S1910, a base station 300 trains DQNs for each step size. For example, assuming that the UAV 200 moves by a step size such as about 5 m, about 10 m, about 50 m, about 100 m, etc., the base station 300 may train the DQN for each step size so that optimal movement parameters of the UAV 200 for a current situation of the UEs may be output.

In step S1020, the base station 300 transmits a flag indicating the start of use of the DQN.

In step S1030, the UAV 200 obtains real-time RSS data and configure a state to be input to the DQN.

In step S1040, the UAV 200 transmits the configured state to the base station 300.

In step S1050, the base station 300 determines an optimal step size based on the RSS data. For example, based on a result of comparison between a recent change amount and average change amount of a downlink data rate from the UAV 20 to the UE, the base station 300 may determine a step size by which the UAV 200 moves. That is, when the amount of increase in data rate gradually increases, the base station 300 may determine that the UAV 200 is moving in the right direction, and determine the largest step size. However, when the amount of increase in data rate gradually decreases, the base station 300 may determine that the UAV 200 is moving in the wrong direction, and determine a step size having a relatively small size.

In step S1060, the base station 300 determines to use a DQN corresponding to the determined step size among a plurality of DQNs.

In step S1070, the base station 300 obtains a DQN output by applying a state received from the UAV 200 to the DQN as an input. The base station 300 may obtain a movement direction of the UAV 200 as the DQN output.

In step S1080, the base station 300 transmits the determined step size and the DQN output to the UAV 200.

In step S1000, the UAV 200 moves according to the step size received from the base station 300 and the movement direction and support the UE.

As described above with reference to FIGS. 4 to 10, a mobile communication system may use a DQN as an RL network, and may use RSS data of UEs as learning data that reflects a current situation of the UEs. However, the disclosure is not limited thereto.

Figure 11:
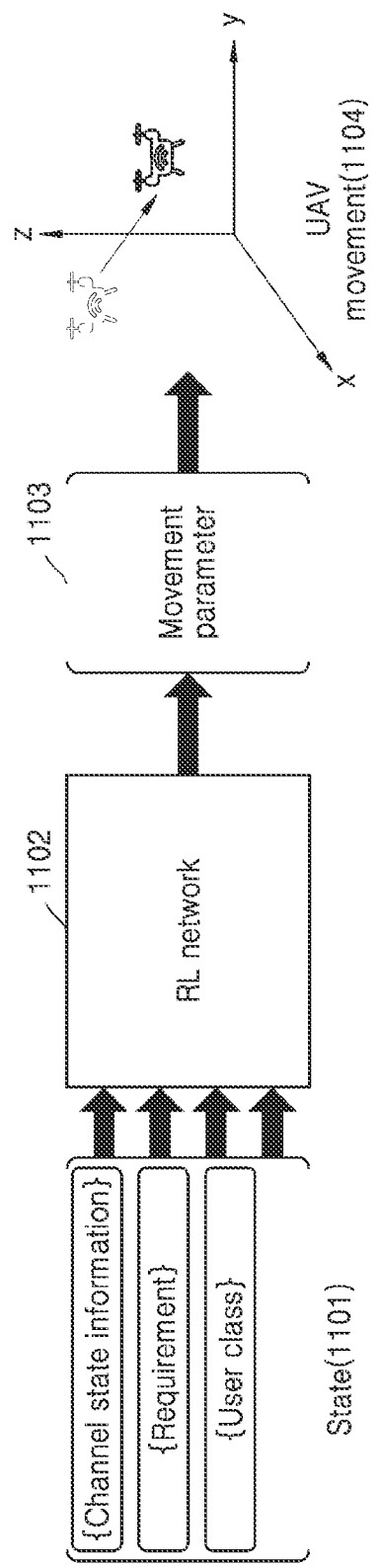
FIG. 11 illustrates a process in which a mobile communication system moves a UAV to an optimal position by using a reinforcement learning (RL) network, according to an embodiment.

For example, a mobile communication system according to an embodiment of the disclosure may train various RL networks by using various UE features and may deploy a UAV in an optimal position. FIG. 11 illustrates a process in which a mobile communication system moves a UAV to an optimal position by using an RL network, according to an embodiment.

Referring to FIG. 11, a base station receiving a state 1101 from a UAV may input the state 1101 to an RL network 1102, thereby obtaining a movement parameter 1103 of the UAV as an output.

In this case, the state 1101 may include various parameters indicating a current state of the UE.

For example, the state 1101 may be expressed in a matrix including a three-dimensional coordinate value indicating a position of the UAV, and a strength of a reference signal received from the UAV in the corresponding position by the UE.

As another example, the state 1101 may include at least one of requirements for each UE, CSI, QoS, or a user class.

With respect to the state 1101 received from the UAV, the RL network 1102 may select and output the movement parameter 1103 for controlling the UAV to move to an optimal position.

The UAV may move based on the movement parameter 1103 received from the base station and may support the UE in the moved position.

The movement parameter 1103 of the UAV may include parameters indicating movement of the UAV in a three-dimensional space. For example, the movement parameter 1103 of the UAV may include at least one of a coordinate value indicating a next position to which the UAV is to move, a movement direction, or a movement distance.

The base station may determine a reward for the RL network 1102 considering whether the movement parameter 1103 derived as an output from the RL network 1102 satisfies requirements for each UE, or a sum data rate.

The base station may inform the RL network 1102 whether the movement parameter 1103 is appropriate or not through a reward based on feedback received from the UAV or the UE after the UAV moves.

Figure 12:
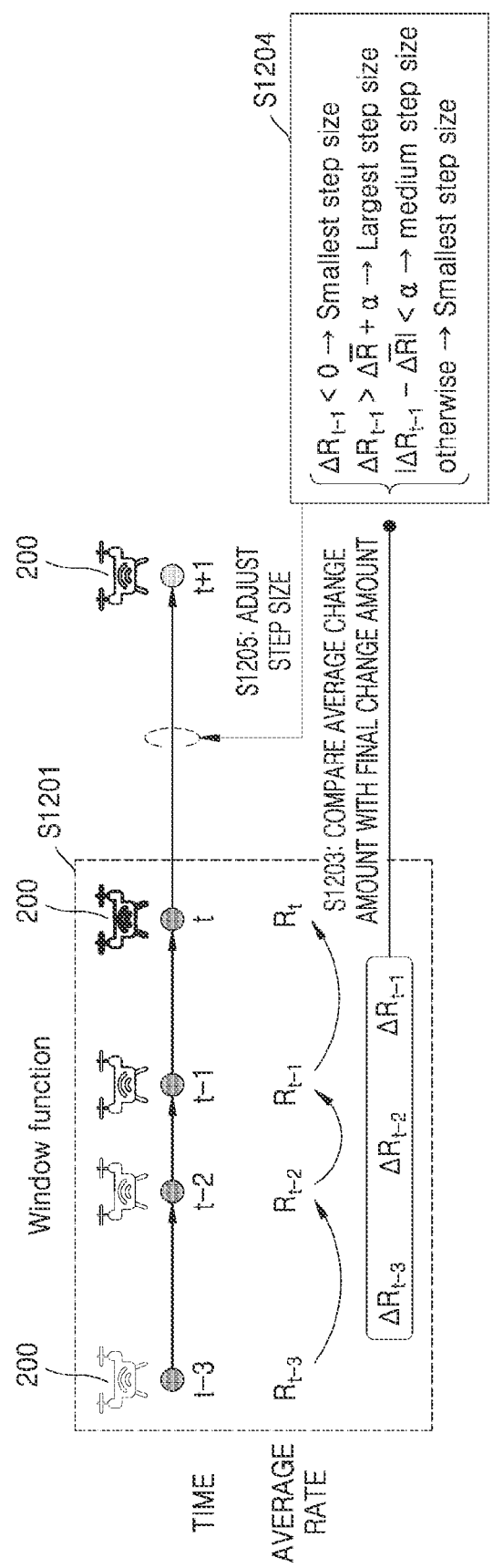
FIG. 12 illustrates a process in which a base station adjusts a step size by which a UAV moves, based on a data rate, according to an embodiment.

FIG. 12 illustrates a process in which a base station adjusts a step size by which a UAV moves, based on a data rate, according to an embodiment.

Referring to FIG. 12, a base station may adaptively change a step size by which a UAV 200 moves according to a change in system parameters such as an RSS. Thus, the UE may be promptly supported through deploying the UAV 200 in a flexible manner according to a state of the UE.

For example, the base station may adjust a step size based on an average change amount of a downlink data rate from the UAV 200 to the UE.

In step S1201, the base station applies a window function to a movement trajectory of the UAV 200 and obtains a data rate for each time period.

In step S1203, the base station determines a step size based on a result of comparison between an average data rate change amount $\Delta R$ and a recent data rate change amount $\Delta Ri$ ($\Delta Ri=Ri+1-Ri$, where i is an integer that is greater than or equal to 0).

When a data rate decreases, the base station may determine that the UAV 200 is moving in the wrong direction, and determine the smallest step size.

When the amount of recent data rate change is greater than the amount of average data rate change by a threshold value ($\alpha$) or greater, the base station may determine that the UAV 200 is moving in the right direction, and determine the largest step size.

In step S1205, the base station may control the UAV 200 to move based on the step size determined in step S1203.

Figure 13:
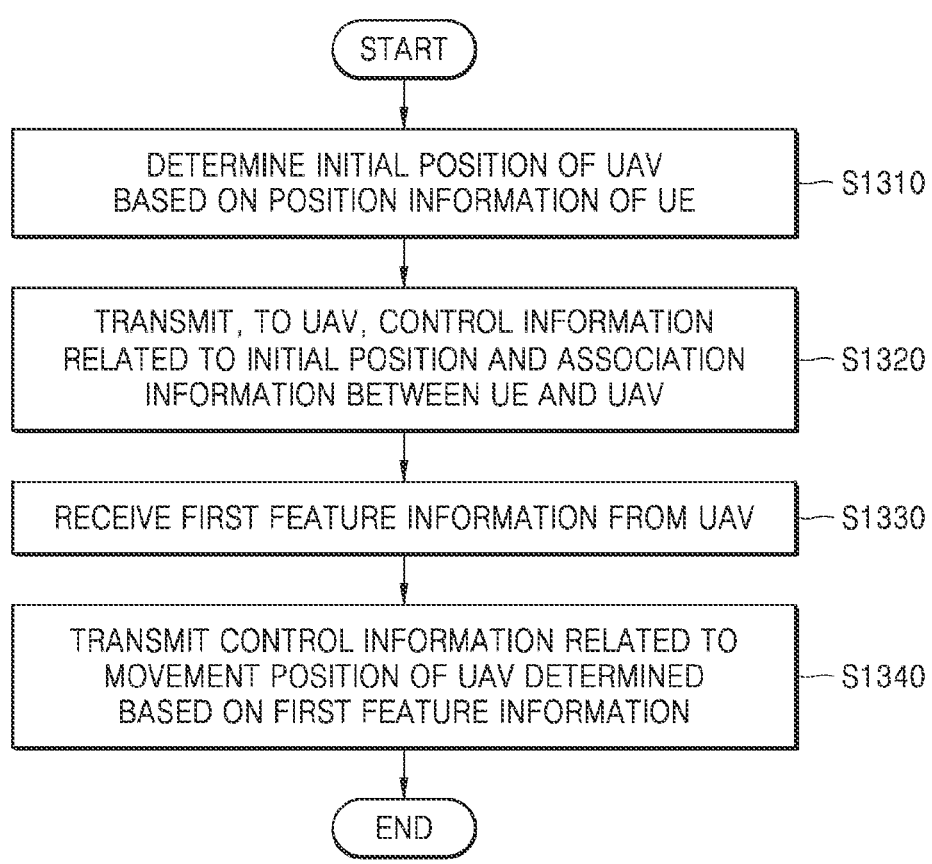
FIG. 13 is a flowchart illustrating an operation method of a base station in a mobile communication system according to an embodiment.

FIG. 13 is a flowchart illustrating a method of a base station in a mobile communication system, according to an embodiment.

Referring to FIG. 13, when determining that it is necessary to deploy an additional UAV, a base station may perform the illustrated method. For example, the base station may determine that it is necessary to deploy a UAV as a relay node for communication of a UE, based on at least one of a request of the UE or the decrease in QoS.

In step S1310, the base station receives position information of at least one UE, and determines an initial position of the UAV based on the position information.

The base station may receive the position information of the at least one UE, and determine a centroid of the position of the at least one terminal as an initial position.

The base station may perform association between the at least one UE and the UAV so that the UAV supports mobile communication of the at least one UE.

In step S1320, the base station transmits, to the UAV, control information related to the initial position and association information between the at least one UE and the UAV. For example, the control information related to the initial position may include a three-dimensional coordinate value of a position in which the UAV is to be deployed.

In step S1330, the base station receives, from the UAV, first feature information related to a communication state between the at least one UE and the UAV. The first feature information may include parameters indicating a current state of the at least one UE. For example, the first feature information may include at least one of position information of the UAV, information about a strength of a reference signal transmitted from the UAV to the at least one UE, UE request information regarding latency and a data rate, a UE class, or communication environment information.

In step S1340, the base station transmits control information related to a movement position of the UAV according to an output of an RL network to which the first feature information is input. For example, the control information related to the movement position of the UAV may include at least one of a coordinate value indicating a next position to which the UAV is to move, a step size of movement, a movement direction, or a movement distance.

The first feature information received from the UAV may be input as a state of an RL network. Parameters related to movement of the UAV may be output as an action of the RL network. The RL network may be pre-trained based on a feature of the UE.

Before step S1330 is performed, the base station may receive, from the UAV, second feature information including RSS data with respect to a strength of a reference signal transmitted from the UAV to the at least one UE.

The base station may obtain an RF map through interpolation of the RSS data included in the second feature information.

The base station may train the RL network based on the RF map. In this case, the base station may train the RL network by further considering at least one of UE request information regarding latency and a data rate, a UE class, or communication environment information.

The base station may determine whether the trained RL network is appropriate, and when it is determined that the trained RL network is inappropriate, the base station may update the RF map, and further train the RL network based on the updated RF map.

However, when determining that the trained RL network is appropriate, the base station may transmit, to the UAV, a flag indicating the start of use of the RL network, and start operating the UAV based on the RL network.

When control information related to a movement position of the UAV is transmitted, the base station may determine a step size by which the UAV moves based on the first feature information. For example, the base station may obtain, from the first feature information, a recent change amount and average change amount of a downlink data rate from the UAV to the UE.

The base station may determine a step size by which the UAV moves based on a result of comparison between the recent change amount and the average change amount. The base station may determine an RL network corresponding to the determined step size among a plurality of RL networks. The base station may apply the first feature information to the RL network corresponding to the determined step size, thereby obtaining information about the movement direction of the UAV.

The base station may transmit the movement direction information and the determined step size to the UAV.

Figure 14:
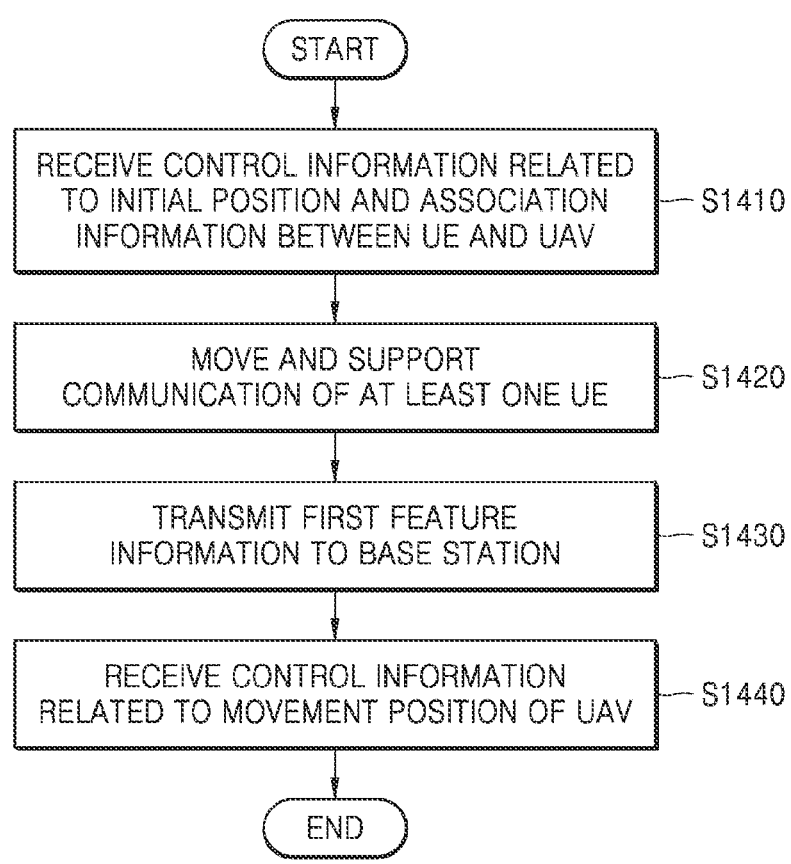
FIG. 14 is a flowchart illustrating an operation method of a UAV in a mobile communication system according to an embodiment.

FIG. 14 is a flowchart illustrating a method of a UAV in a mobile communication system, according to an embodiment.

Referring to FIG. 14, in step S1410, the UAV receives, from a base station, control information related to initial position and association information between at least one UE and the UAV.

In step S1420, the UAV moves, and supports communication of the at least one UE based on the control information related to the initial position. For example, the control information related to the initial position may include a three-dimensional coordinate value of a position in which the UAV is to be deployed.

The UAV may transmit a reference signal from the UAV to the at least one UE, and in response to the transmitted reference signal, the UAV may receive, from the UE, feedback regarding a strength of the reference signal received by the UE.

In step S1430, the UAV transmits, to the base station, first feature information related to a communication state between the at least one UE and the UAV. For example, the first feature information may include position information of the UAV and information about the strength of the reference signal transmitted from the UAV to the UE.

As another example, the first feature information may include at least one of information about a strength of a reference signal transmitted from the UAV to the at least one UE, UE request information regarding latency and a data rate, a UE class, or communication environment information.

In step S1440, in response to the first feature information, the UAV receives, from the base station, control information related to a movement position of the UAV.

The control information related to the movement information of the UAV may include movement direction information of the UAV and a step size by which the UAV moves.

According to the various embodiments of the disclosure described above, current states of UEs are trained based on reinforced learning, and the trained current states of the UEs are then used to deploy a UAV, and thus, communication of the UE may be promptly and adaptively supported according to a situation of the UE.

Figure 15:
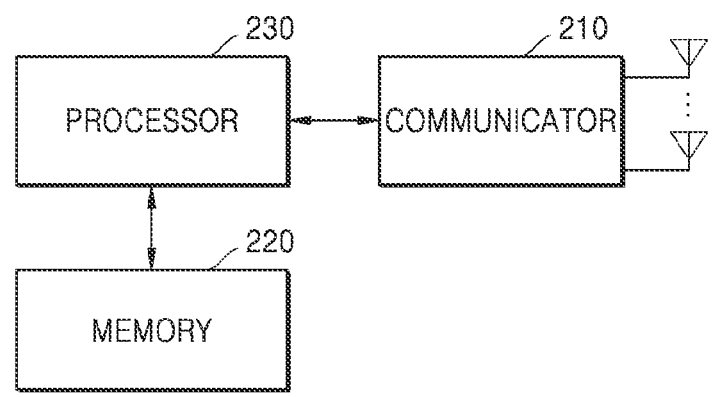
FIG. 15 illustrates a UAV according to an embodiment.

FIG. 15 illustrates a UAV according to an embodiment. For example, the configuration illustrated in FIG. 15 may be used as a configuration for the UAV 200 described above.

Referring to FIG. 15, a UAV may include an electronic control device, but is not limited thereto. For example, the UAV may be an additional electronic device distinguished from a main body of a flight driving unit that includes a propeller for flight, a sensor module for sensing a posture or a state, and a battery for power supply. The UAV may be a UAV control system, a communication terminal mounted on the UAV, or a UAV communication system.

The UAV includes a communicator 210, a memory 220, and a processor 230.

The communicator 210 may perform functions for transmitting and receiving signals via a mobile channel. For example, the communicator 210 performs a conversion function between a baseband signal and a bit string according to a physical layer standard of a system. During data transmission, the communicator 210 generates complex symbols by encoding and modulating a transmission bit stream. When data is received, the communicator 210 may recover a reception bit string by demodulating and decoding a baseband signal.

In addition, the communicator 210 may up-convert a baseband signal into an RF band signal and transmit the RF band signal through an antenna, and may down-convert an RF band signal received through the antenna into a baseband signal. The communicator 210 may include a transmission filter, a reception filter, an amplifier, a mixer, an oscillator, a digital-to-analog converter (DAC), an analog-to-digital converter (ADC), etc. In addition, the communicator 210 may include a plurality of transmission and reception paths, or the communicator 210 may include at least one antenna array composed of multiple antenna elements.

In terms of hardware, the communicator 210 may be composed of a digital unit and an analog unit (e.g., an RF integrated circuit (RFIC)). The digital circuit and the analog circuit may be implemented as one package. In addition, the communicator 210 may include a plurality of RF chains.

Further, the communicator 210 may perform beamforming.

As described above, the communicator 210 may transmit and receive signals. Thus, all or part of the communicator 210 may be referred to as a transmitter, a receiver, or a transceiver.

In addition, in the description, transmissions and receptions performed through a mobile channel are used to indicate that a processing as described above is performed by the communicator 210.

The memory 220 stores data, such as basic programs, application programs, and configuration information for operations of the UAV. The memory 220 may include a volatile memory, a non-volatile memory, and a combination thereof. In addition, the memory 220 may provide stored data according to a request of the processor 230.

The processor 230 may control overall operations of the UAV. For example, the processor 230 transmits and receives signals via the communicator 210. In addition, the processor 230 writes and reads data on and from the memory 220, and may perform functions of a protocol stack required by a communication specification. Accordingly, the processor 230 may include at least one processor or microprocessor, or may be a part of the microprocessor.

In addition, part of the communicator 210 and the processor 230 may be referred to as communication processors (CPs).

The processor 230 may control the UAV to perform operations according to one or more embodiments described above.

In FIG. 15, although the UAV includes one processor 230, the example is not limited thereto, and the UAV may include a plurality of processors.

At least a part of operations and functions of the processor 230 described herein may be performed by the plurality of processors.

The processor 230 may receive, from a base station, control information related to an initial position of the UAV and association information between at least one UE and the UAV.

The processor 230 may move and may support communication of the at least one UE based on the control information related to the initial position. For example, the control information related to the initial position may include a three-dimensional coordinate value of a position in which the UAV is to be deployed.

The processor 230 may transmit a reference signal to the at least one UE, and in response to the transmitted reference signal, the processor 230 may receive, from the UE, feedback regarding a strength of the reference signal received by the UE.

The processor 230 may transmit, to the base station, first feature information related to a communication state between the at least one UE and the UAV. For example, the first feature information may include information about the strength of the reference signal transmitted from the UAV to the UE.

As another example, the first feature information may include at least one of information about the strength of the reference signal transmitted from the UAV to the at least one UE, UE request information regarding latency and a data rate, a UE class, or communication environment information.

The processor 230 may receive control information related to a movement position of the UAV in response to the first feature information. The control information related to the movement information of the UAV may include movement direction information of the UAV and a step size by which the UAV moves.

Figure 16:
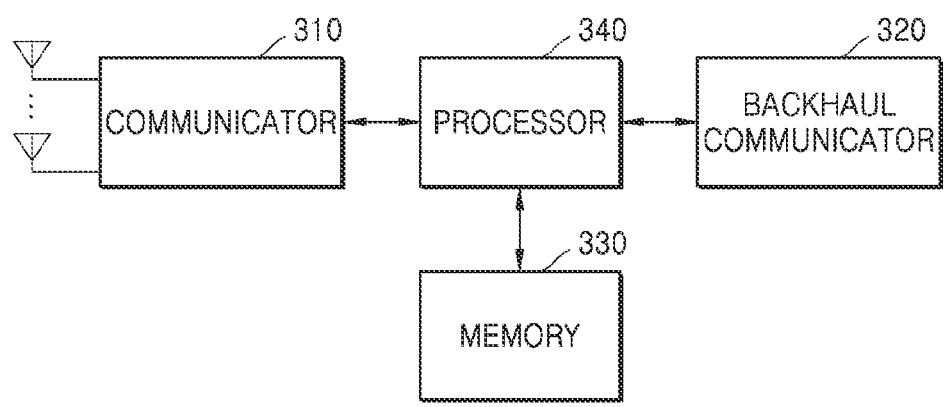
FIG. 16 illustrates a base station according to an embodiment.

FIG. 16 shows a block diagram of the base station 300 according to an embodiment of the disclosure.

FIG. 16 illustrates a base station in a mobile communication system according to an embodiment.

Referring to FIG. 16, the base station includes a communicator 310, a backhaul communicator 320, a memory 330, and a processor 340.

The base station illustrated in FIG. 16 may perform an operation method according to various embodiments of the disclosure, and may be subject to the descriptions of FIGS. 1 to 14 above.

The communicator 310 may perform functions for transmitting and receiving signals via a mobile channel. For example, the communicator 310 performs a conversion function between a baseband signal and a bit string according to a physical layer standard of a system. During data transmission, the communicator 310 generates complex symbols by encoding and modulating a transmission bit stream. When data is received, the communicator 310 may recover a reception bit string by demodulating and decoding a baseband signal.

In addition, the communicator 310 may up-convert a baseband signal into an RF band signal and transmit the RF band signal through an antenna, and may down-convert an RF band signal received through the antenna into a baseband signal. Accordingly, the communicator 310 may include a transmission filter, a reception filter, an amplifier, a mixer, an oscillator, a DAC, an ADC, etc.

In addition, the communicator 310 may include a plurality of transmission and reception paths, or may include at least one antenna array composed of a plurality of antenna elements.

In terms of hardware, the communicator 310 may be composed with a digital unit and an analog unit, which may be composed of a plurality of sub-units according to operating power, operating frequency, etc.

The digital unit may be implemented as at least one processor (e.g., a digital signal processor (DSP)).

As described above, the communicator 310 may transmit and receive signals. Thus, all or part of the communicator 310 may be referred to as a transmitter, a receiver, or a transceiver.

In addition, in the description herein, transmission and reception performed through a mobile channel are used to indicate that a processing as described above is performed by the communicator 310.

The backhaul communicator 320 provides an interface for communicating with other nodes in the network. That is, the backhaul communicator 320 may convert a bit stream transmitted from the base station to another node, e.g., another access node, another base station, a higher node, a core network, etc., into a physical signal, and may convert a physical signal received from another node into a bit stream.

The memory 330 stores data, such as basic programs, application programs, and configuration information for operations of the base station.

The memory 330 may include a volatile memory, a non-volatile memory, and a combination thereof.

In addition, the memory 330 may provide stored data according to a request of the processor 340.

The processor 340 may control overall operations of the base station. For example, the processor 340 may transmit and receive signals via the communicator 310 or the backhaul communicator 320. In addition, the processor 340 may write and read data on and from the memory 330, and may perform functions of a protocol stack required by a communication specification. Alternatively, the protocol stack may be included in the communicator 310.

The processor 340 may include at least one processor.

At least a part of operations and functions of the processor 340 described herein may be performed by a plurality of processors.

The processor 340 may control the base station to perform operations according to one or more embodiments described herein.

The processor 340 may determine that it is necessary to deploy an additional UAV. For example, the processor 340 may determine that it is necessary to deploy the UAV as a relay node for communication of the UE, based on at least one of a request of the UE or the decrease in QoS.

The processor 340 may determine an initial position of the UAV based on position information of at least one UE.

The processor 340 may receive the position information of the at least one UE, and may determine a centroid of the position of the at least one UE as the initial position.

The processor 340 may perform association between the at least one UE and the UAV so that the UAV supports mobile communication of the at least one UE.

The processor 340 may transmit, to the UAV, control information related to the initial position and association information between the at least one UE and the UAV. For example, the control information related to the initial position may include a three-dimensional coordinate value of a position in which the UAV is to be deployed.

The processor 340 may train an RL network based on a feature of the UE.

The processor 340 may receive, from the UAV, RSS data regarding a strength of a reference signal transmitted from the UAV to the at least one UE, The processor 340 may obtain an RF map through interpolation of the RSS data and may train the RL network based on the RF map.

The processor 340 may train the RL network by further considering at least one of UE request information regarding latency and a data rate, a UE class, or communication environment information.

The processor 340 may determine whether the trained RL network is appropriate, and when it is determined that the trained RL network is inappropriate, update the RF map, and further train the RL network based on the updated RF map.

When determining that the trained RL network is appropriate, the processor 340 may transmit, to the UAV, a flag indicating the start of use of the RL network.

The processor 340 may transmit control information related to a movement position of the UAV according to an output of an RL network to which the first feature information is input.

The processor 340 may receive, from the UAV 200, first feature information related to a communication state between the at least one UE and the UAV. The first feature information may include parameters indicating a current state of the UE. For example, the first feature information may include at least one of information about a strength of a reference signal transmitted from the UAV to the at least one UE, UE request information regarding latency and a data rate, a UE class, or communication environment information.

The first feature information received from the UAV may be input as a state of an RL network.

Parameters related to movement of the UAV may be output as an action of the RL network.

When the control information related to the movement position of the UAV 200 is transmitted, the processor 340 may determine a step size by which the UAV 200 moves based on the first feature information. For example, the processor 340 may obtain, from the first feature information, a recent change amount and average change amount of a downlink data rate from the UAV to the UE.

The processor 340 may determine a step size by which the UAV moves based on a result of comparison between the recent change amount and the average change amount.

The processor 340 may determine an RL network corresponding to the determined step size among a plurality of RL networks. The processor 340 may apply the first feature information to the RL network corresponding to the determined step size, to thereby obtain information about the movement direction of the UAV 200.

The processor 340 may transmit, to the UAV, the movement direction information and the determined step size.

The methods according to the embodiments of the disclosure, which are described in the claims or the specification, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure. One or more programs (software modules, software, etc.) may be stored in random access memory (RAM), non-volatile memory including flash memory, read only memory (ROM), electrically erasable programmable read only memory (EEPROM), magnetic disk storage device, compact disc-ROM (CD-ROM), digital versatile discs (DVDs), other types of optical storage devices, or magnetic cassette.

Alternatively, one or more programs may be stored in a memory provided by a combination of all or part of these devices.

In addition, each memory may include a plurality of configured memories.

The programs may be stored in an attachable storage device that may be accessed through a communication network such as Internet, Intranet, local area network (LAN), wide LAN (WLAN), or storage area network (SAN), or through a communication network composed of any combination thereof.

These storage devices may be connected through an external port to a device that performs the embodiments of the disclosure.

In addition, a separate storage on the communication network may access the device that performs the embodiment of the disclosure.

In the above-described embodiments of the disclosure, while the components are expressed in the singular or plural according to the presented particular embodiments of the disclosure, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Several embodiments of the disclosure have been described, but a person of ordinary skill in the art will understand and appreciate that various modifications can be made without departing the scope of the disclosure, Thus, it will be apparent to those of ordinary skill in the art that the disclosure is not limited to the embodiments of the disclosure, which have been provided only for illustrative purposes.

In addition, each of the above embodiments may be combined and operated as necessary. For example, parts of an embodiment other than an embodiment of the disclosure may be combined.

In addition, the embodiments may be implemented in other systems, for example, LTE systems, 5G or NR systems, and other modifications based on the technical idea of the embodiments described above.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a base station in a wireless communication system, the method comprising:
   receiving position information of at least one user equipment (UE);
   determining an initial position of an unmanned aerial vehicle (UAV) based on the position information;
   transmitting, to the UAV, control information related to the initial position and association information between the at least one UE and the UAV;
   receiving, from the UAV, first feature information related to a communication state between the at least one UE and the UAV;
   determining a step size b which the UAV moves, based on the first feature information;
   obtaining movement direction information of the UAV by applying the first feature information to a reinforced learning network corresponding to the determined step size among a plurality of reinforced learning networks; and
   transmitting the movement direction information and information regarding the determined step size to the UAV.

2. The method of claim 1, further comprising determining to deploy the UAV as a relay node for communication of the at least one UE, based on at least one of a request of the at least one UE or a decrease in quality of service (QoS).

3. The method of claim 1, wherein the at least one UE includes a plurality of UEs, and
   wherein determining the initial position of the UAV comprises:
      determining a centroid of positions of the plurality of UEs as the initial position; and
      associating the plurality of UEs with the UAV for the UAV to support wireless communication of the plurality of UEs.

4. The method of claim 1, wherein the control information related to the initial position includes a three-dimensional coordinate value of a position where the UAV is to be deployed.

5. The method of claim 1, wherein the first feature information includes at least one of information about a strength of a reference signal transmitted to the at least one UE from the UAV, UE request information about latency and a data rate, a UE class, or communication environment information.

6. The method of claim 1, further comprising:
   receiving, from the UAV, second feature information including received signal strength (RSS) data regarding a strength of a reference signal transmitted to the at least one VIE from the UAV;
   obtaining a radio frequency (RF) map through interpolation of the RSS data included in the second feature information; and
   training the reinforced learning network based on the RF map.

7. The method of claim 6, further comprising:
   determining whether the reinforced learning network is appropriate;
   when it is determined that the reinforced learning network is inappropriate, updating the RF map, and further training the reinforced learning network based on the updated RF map; and
   when it is determined that the reinforced learning network is appropriate, transmitting, to the UAV, information indicating a start of use of the reinforced learning network.

8. The method of claim 1, further comprising:
   receiving second feature information including received signal strength (RSS) data regarding a strength of a reference signal transmitted to the at least one UE from the UAV; and
   training the reinforced learning network based on the second feature information and at least one of UE request information regarding latency and a data rate, a UE class, or communication environment information.

9. The method of claim 1, wherein determining the step size by which the UAV moves comprises:
   obtaining, from the first feature information, a recent change amount and an average change amount of a downlink data rate from the UAV to the UE; and
   determining the step size by which the UAV moves based on a result of a comparison between the recent change amount and the average change amount.

10. A method of an unmanned aerial vehicle (UAV) in a wireless communication system, the method comprising:
    receiving, from a base station, control information related to an initial position and association information between at least one user equipment (UE) and the UAV;
    supporting communication of the at least one UE by moving based on the control information related to the initial position;
    transmitting, to the base station, first feature information related to a communication state between the at least one UE and the UAV; and
    receiving, from the base station movement direction information and information regarding a step size by which the UAV moves,
    wherein the step size is determined based on the first feature information, and
    wherein the movement direction information is determined by applying the first feature information to a reinforced learning network corresponding to the determined step size among a plurality of reinforced learning networks.

11. The method of claim 10, wherein the control information related to the initial position includes a three-dimensional coordinate value of a position where the UAV is to be deployed.

12. The method of claim 10, wherein supporting communication of the at least one UE comprises:
    transmitting a reference signal to the at least one UE; and
    receiving feedback regarding a strength of the reference signal, and
    wherein the first feature information includes information about the strength of the reference signal.

13. The method of claim 10, wherein the first feature information includes at least one of information about a strength of a reference signal transmitted to the at least one UE from the UAV, UE request information about latency and a data rate, a LTE class, or communication environment information.

14. A base station for use in a wireless communication system including at least one user equipment (UE) and an unmanned aerial vehicle (UAV), the base station comprising:
   a transceiver configured to transmit and receive signals to and from the at least one UE and the UAV;
   a memory configured to store a program and data for operations of the base station; and
   at least one processor configured to execute the program stored in the memory to:
   determine an initial position of the UAV based on position information of the at least one UE;
   transmit, to the UAV, control information related to the initial position and association information between the at least one LTE and the UAV;
   receive, from the UAV, first feature information related to a communication state between the at least one UE and the UAV;
   determine a step size by which the UAV moves, based on the first feature information;
   obtain movement direction information of the UAV by applying the first feature information to a reinforced learning network corresponding to the determined step size among a plurality of reinforced learning networks; and
   transmit the movement direction information and information regarding the determined step size to the UAV.

15. The base station of claim 14, wherein the at least one processor is further configured to determine to deploy the UAV as a relay node for communication of the at least one UE, based on at least one of a request of the at least one UE or a decrease in quality of service (QoS).

16. The base station of claim 14, wherein the at least one UE includes a plurality of UEs, and wherein determining the initial position of the UAV comprises:
   determining a centroid of positions of the plurality of UEs as the initial position; and
   associating the plurality of UEs with the UAV for the UAV to support wireless communication of the plurality of UEs.

17. The base station of claim 14, wherein the control information related to the initial position includes a three-dimensional coordinate value of a position where the UAV is to be deployed.

18. The base station of claim 14, wherein the first feature information includes at least one of information about a strength of a reference signal transmitted to the at least one UE from the UAV, UE request information about latency and a data rate, a UE class, or communication environment information.

19. The base station of claim 14, wherein the at least one processor is further configured to:
   receive, from the UAV, second feature information including received signal strength (RSS) data regarding a strength of a reference signal transmitted to the at least one UE from the UAV;
   obtain a radio frequency (RF) map through interpolation of the RSS data included in the second feature information; and
   train the reinforced learning network based on the RF map.

20. The base station of claim 14, wherein the at least one processor is further configured to:
   receive second feature information including received signal strength (RSS) data regarding a strength of a reference signal transmitted to the at least one UE from the UAV; and
   train the reinforced learning network based on the second feature information and at least one of UE request information regarding latency and a data rate, a UE class, or communication environment information.

* * * * *